United States Patent
Yamamoto

(10) Patent No.: US 9,302,632 B2
(45) Date of Patent: Apr. 5, 2016

(54) TETHER CLIP AND PILLAR GARNISH MOUNTING STRUCTURE

(71) Applicant: TOYOTA JIDOSHA KABUSHIKI KAISHA, Toyota-shi, Aichi-ken (JP)

(72) Inventor: Kazuhito Yamamoto, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 14/604,117

(22) Filed: Jan. 23, 2015

(65) Prior Publication Data
US 2015/0210227 A1 Jul. 30, 2015

(30) Foreign Application Priority Data
Jan. 29, 2014 (JP) .................. 2014-014696

(51) Int. Cl.
| | | |
|---|---|---|
| B60R 21/216 | (2011.01) | |
| B60R 13/02 | (2006.01) | |
| F16B 5/06 | (2006.01) | |
| F16B 21/08 | (2006.01) | |

(52) U.S. Cl.
CPC ........... *B60R 13/025* (2013.01); *B60R 13/0206* (2013.01); *F16B 5/065* (2013.01); *B60R 21/216* (2013.01); *F16B 21/086* (2013.01); *Y10T 24/42* (2015.01)

(58) Field of Classification Search
CPC .. B60R 13/02; B60R 13/0206; B60R 13/025; B60R 21/216; B60R 21/2161; B60R 21/2163
USPC ................. 296/39.1, 1.08, 187.05, 193.06
See application file for complete search history.

(56) References Cited

U.S. PATENT DOCUMENTS

| | | | |
|---|---|---|---|
| 6,431,584 B1* | 8/2002 | Nagasawa | B60R 13/0206 280/728.2 |
| 7,077,449 B2* | 7/2006 | Tokunaga | B60R 13/0206 296/187.05 |
| 7,698,788 B2* | 4/2010 | Hansen | B60R 21/213 24/297 |
| 8,480,120 B1* | 7/2013 | Fukuda | B60R 13/0206 24/453 |
| 9,132,789 B2* | 9/2015 | Suzuki | B60R 13/0206 |
| 2003/0094828 A1* | 5/2003 | Nagamoto | B60R 13/0206 296/39.1 |
| 2007/0075531 A1 | 4/2007 | Tsuge | |
| 2010/0199464 A1* | 8/2010 | Sano | B60R 13/02 24/289 |
| 2011/0248480 A1* | 10/2011 | Glaser | B60R 13/0206 280/728.2 |
| 2013/0168515 A1* | 7/2013 | Yamamoto | B60R 13/0206 248/231.81 |
| 2013/0257025 A1 | 10/2013 | Yamamoto | |
| 2014/0008501 A1* | 1/2014 | Satou | B60R 13/0275 248/68.1 |
| 2014/0319808 A1* | 10/2014 | Yamamoto | B60R 13/0206 280/730.2 |
| 2015/0191131 A1* | 7/2015 | Yamamoto | F16B 2/20 24/289 |
| 2015/0210227 A1* | 7/2015 | Yamamoto | B60R 13/025 296/193.06 |
| 2015/0211555 A1* | 7/2015 | Yamamoto | B60R 13/0206 24/289 |

FOREIGN PATENT DOCUMENTS

| | | |
|---|---|---|
| EP | 2722534 A1 | 4/2014 |
| JP | 2006-103426 A | 4/2006 |
| JP | 2006176089 A | 7/2006 |
| JP | 2007-098986 A | 4/2007 |

(Continued)

*Primary Examiner* — Gregory Blankenship
(74) *Attorney, Agent, or Firm* — Oliff PLC

(57) ABSTRACT

A tether clip used to attach a pillar garnish to a pillar has a base, a tether portion, and a garnish retaining portion. The tether portion and the garnish retaining portion rise from a surface of the base. The tether portion is provided in a location away from the garnish retaining portion.

13 Claims, 6 Drawing Sheets

(56) References Cited

FOREIGN PATENT DOCUMENTS

| | | |
|---|---|---|
| JP | 2008-230363 A | 10/2008 |
| JP | 2011-157054 A | 8/2011 |
| JP | 2011-161946 A | 8/2011 |
| JP | 2013-113419 A | 6/2013 |
| JP | 2013-210018 A | 10/2013 |
| WO | 2012/032603 A1 | 3/2012 |
| WO | 2014/020655 A1 | 2/2014 |

* cited by examiner

TETHER CLIP AND PILLAR GARNISH MOUNTING STRUCTURE

INCORPORATION BY REFERENCE

The disclosure of Japanese Patent Application No. 2014-014696 filed on Jan. 29, 2014 including the specification, drawings and abstract is incorporated herein by reference in its entirety.

BACKGROUND OF THE INVENTION

1. Field of the Invention

The invention relates to a clip and a pillar garnish mounting structure using this clip. In this specification, the term "mounting structure" may be referred to as a Mounting device.

2. Description of Related Art

Japanese Patent Application Publication No. 2007-098986 (JP 2007-098986 A) and Japanese Patent Application Publication No. 2006-176089 (JP 2006-176089 A) describe related tether clips. The tether clips according to the related art have an engagement retaining portion (garnish retaining portion) for attaching a pillar garnish to a pillar panel, a tether portion that has an anchor portion on a tip end that rises from the garnish retaining portion, and inhibits the pillar garnish from flying out and a body retaining protrusion for fixing to a pillar inner panel. During normal operation, the tether clips according to the related art attach the pillar garnish to the pillar, and inhibit the pillar garnish from flying out while it is partially open when a curtain airbag (Curtain Shield Airbag: CSA) deploys.

However, with the tether clips according to the related art, the tether portion rises up from the garnish retaining portion, so if the curvature radius of the tether portion is increased, a large space in the clip insertion direction of the tether clip housing portion in the pillar garnish is required. On the other hand, if the curvature radius of the tether portion is reduced, the tether portion may be pulled by a large force and fracture from the curved portion when the CSA deploys.

SUMMARY OF THE INVENTION

The invention thus provides a tether clip in which the curvature radius of the tether portion is able to be increased without requiring a large space in the clip insertion direction of the pillar garnish, and a pillar garnish mounting structure that uses this tether clip.

A first aspect of the invention relates to a tether clip that includes a base, a tether portion, and a garnish retaining portion. The tether clip is used to attach a pillar garnish to a pillar. The tether portion rises from a surface of the base. The garnish retaining portion rises from the surface of the base. The tether portion is provided in a location away from the garnish retaining portion.

A second aspect of the invention relates to a pillar garnish mounting structure that includes the tether clip according to the first aspect described above, a pillar, and a pillar garnish that is attached to the pillar by the tether clip. The tether portion is arranged from a vehicle front side to a vehicle rear side in a longitudinal direction of the pillar.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
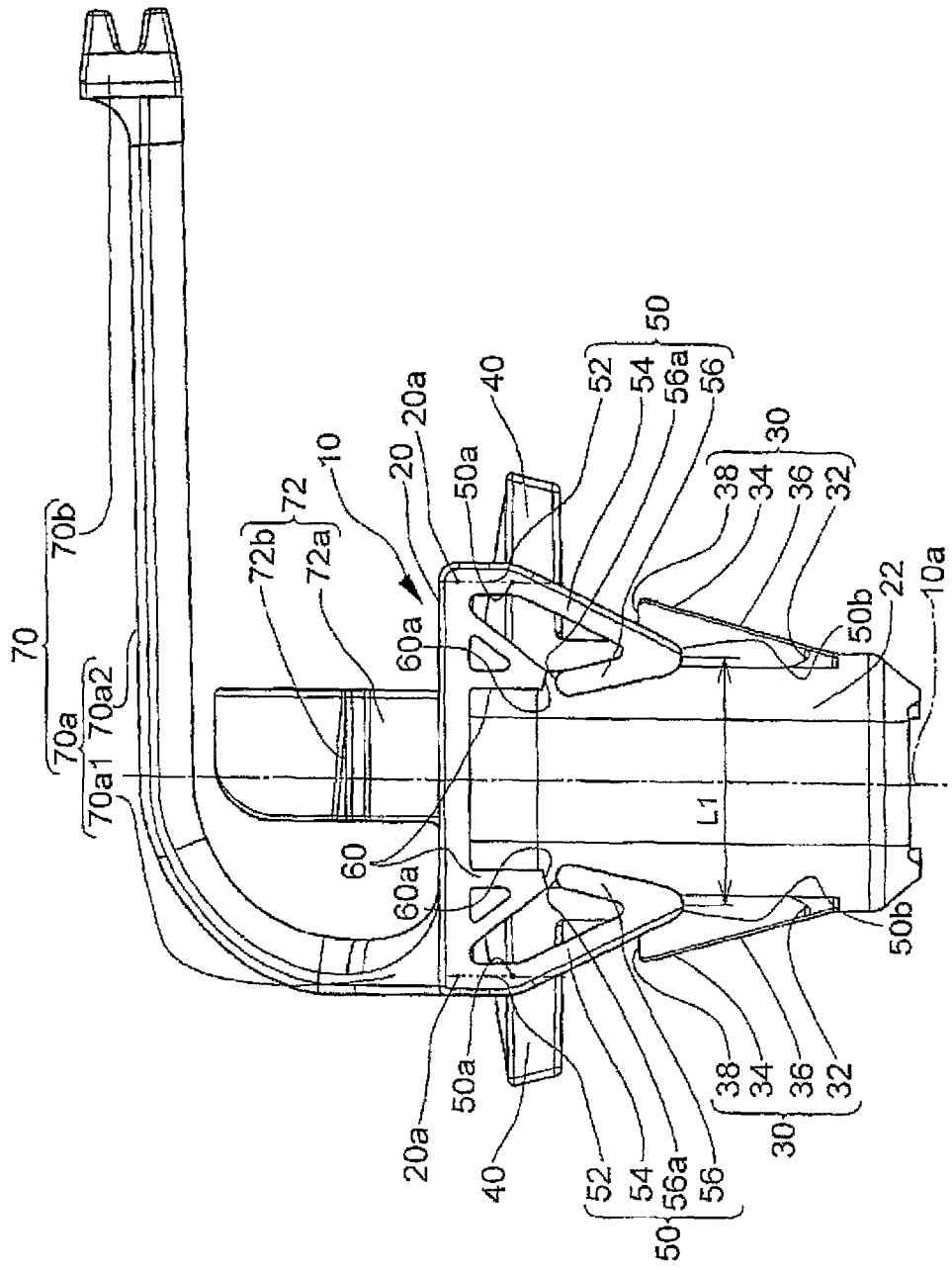
FIG. 1 is a front view of a tether clip according to one example embodiment of the invention.

First, an outline of the tether clip and a pillar garnish mounting structure according to an example embodiment of the invention will be described.

A tether clip according to the example embodiment of the invention includes a base, a tether portion, and a garnish retaining portion. The tether clip is used to attach a pillar garnish to a pillar. The tether portion rises from a surface of the base. The garnish retaining portion rises from the surface of the base. The tether portion is provided in a location away from the garnish retaining portion.

With the tether clip according to the example embodiment of the invention, the tether portion is provided in a location away from the garnish retaining portion. Therefore, the space (in the tether clip housing portion) of the pillar garnish in the vehicle inside direction (a direction orthogonal to the pillar garnish longitudinal direction) is able to be reduced, and the curvature radius of a base portion of the tether portion is able to be increased.

A tether portion of the tether clip according to the example embodiment of the invention is arranged from a first side of a base to a second side of the base, directly above a garnish retaining portion.

In the tether clip described above, the tether portion is arranged from the first side of the base to the second side of the base, directly above the garnish retaining portion. Therefore, the space (of the tether clip housing portion) in the pillar garnish in the vehicle inside direction (a direction orthogonal to a pillar garnish longitudinal direction) is able to be reduced.

The first side of the base constitutes a first end portion of the base, and the second side of the base constitutes a second end portion of the base that is opposite to the first end portion of the base.

A first portion of the base from which the garnish retaining portion rises overlaps with a clip central axis. Moreover, a second portion from which the tether portion rises is offset from the clip central axis.

According to this tether clip, the first portion of the base from which the garnish retaining portion rises overlaps with the clip central axis, and the second portion of the base from which the tether portion rises is offset from the clip central axis. Therefore, the garnish retaining portion is located on a base center portion. Thus, the space (of the tether clip housing portion) in the pillar garnish is able to be made smaller in the vehicle inside direction.

The second portion of the base constitutes an end portion of the base. The tether portion has a curved portion that is connected to the base and extends to directly above the garnish retaining portion. A connecting portion of the curved portion that connects to the base is separated from the garnish retaining portion in the longitudinal direction of the tether portion.

The tether portion has a straight portion that is connected to the curved portion and is parallel to a surface of the base.

The garnish retaining portion has a bulging portion that bulges out in a direction orthogonal to the longitudinal direction of the tether portion and a rising direction of the garnish retaining portion.

The tether portion, the garnish retaining portion, and the base are integrally formed.

The pillar garnish mounting structure according to the example embodiment of the invention includes the tether clip, a pillar, and a pillar garnish. The pillar garnish is attached to the pillar by the tether clip. The tether portion is arranged from a vehicle front side to a vehicle rear side in the longitudinal direction of the pillar.

According to this pillar garnish mounting structure, the tether portion is arranged from the vehicle front side to the vehicle rear side in the longitudinal direction of the pillar. Therefore, the space (of the tether clip housing portion) in the pillar garnish is able to be reduced in the vehicle inside direction (i.e., in a direction orthogonal to the pillar garnish longitudinal direction). Also, a bending curvature radius of a base portion of the tether, portion is able to be increased. As a result, the pillar garnish is able to be made smaller, and the reliability in terms of strength, of the tether clip is able to be improved.

The pillar has a body retaining hole. The tether clip has a retaining protrusion that is inserted through the body retaining hole and engages with the body retaining hole.

The garnish retaining portion is attached to the pillar garnish.

Figure 4:
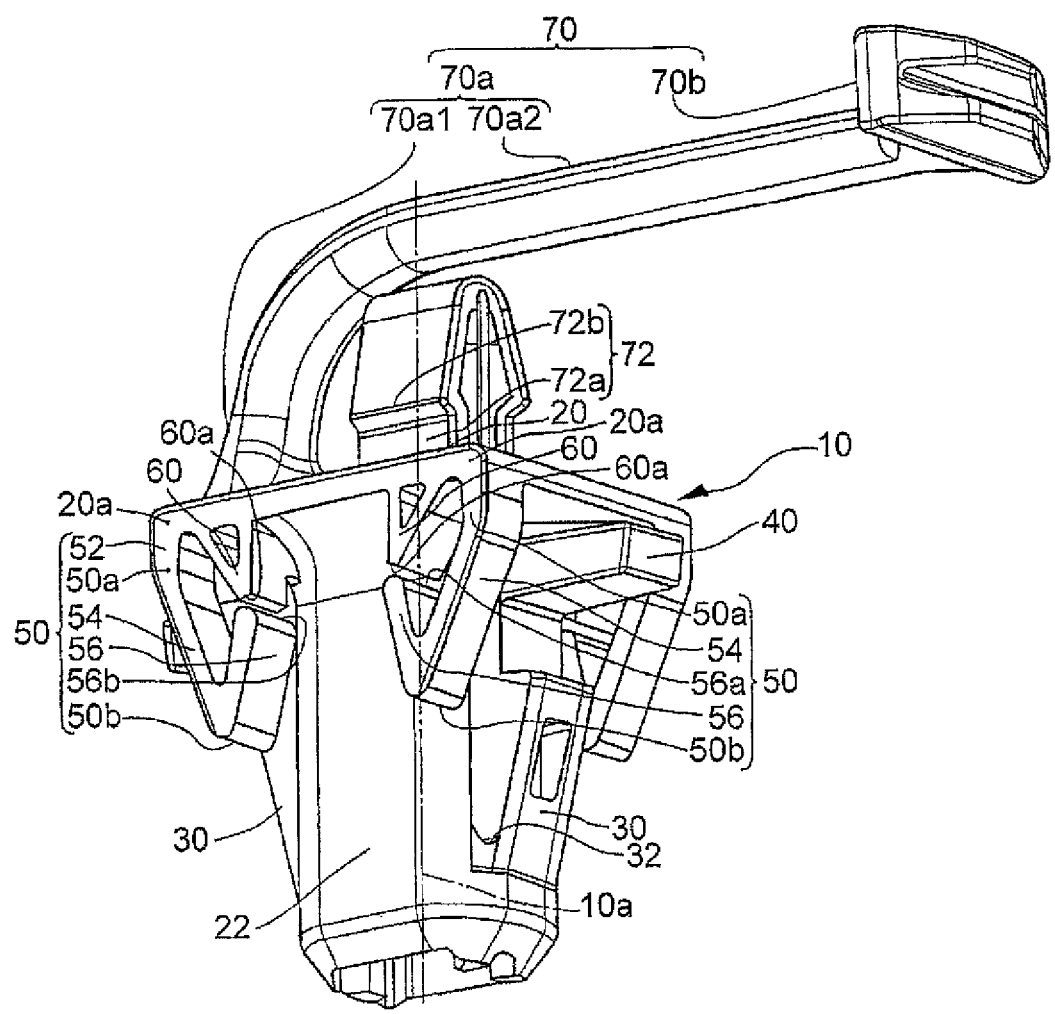
FIG. 4 is a perspective view of the tether clip in FIG. 1.
Figure 5:
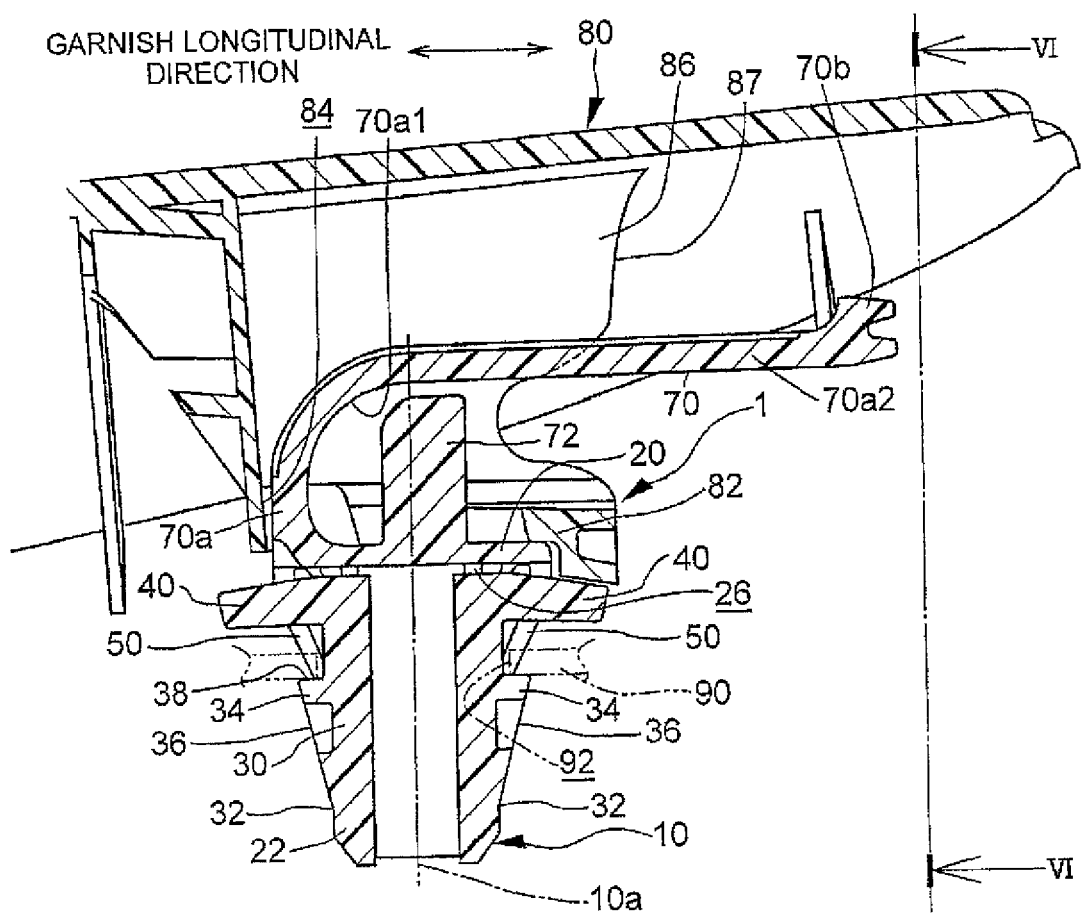
FIG. 5 is a sectional view of the pillar garnish mounting structure that uses the tether clip according to the example embodiment of the invention.
Figure 6:
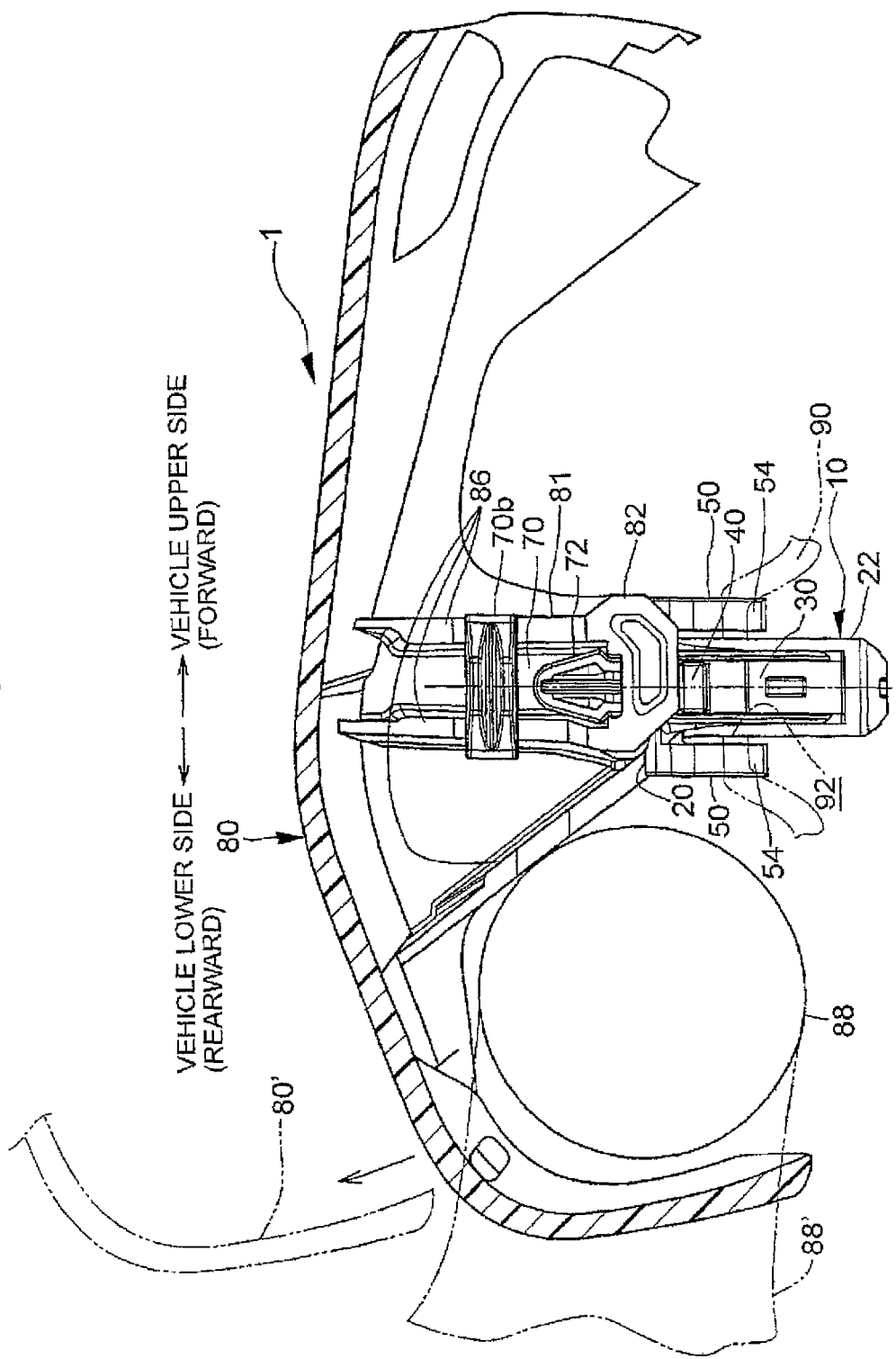
FIG. 6 is an enlarged sectional view taken along line 6-6, of the pillar garnish mounting structure in FIG. 5.

Next, a tether clip 10 according to one example embodiment of the invention, and a pillar garnish mounting structure 1 that attaches a pillar garnish to a pillar using this tether clip will be described with reference to FIGS. 1 to 6. The main portion of the pillar garnish mounting structure 1 is the tether clip 10, so the main portions of the tether clip 10 and the pillar garnish mounting structure may be regarded as the same. FIGS. 1 to 4 are related to the tether clip 10, and FIGS. 5 and 6 are related to the pillar garnish mounting structure 1.

The structures of the tether clip (hereinafter, also simply referred to as "clip") 10 and the pillar garnish mounting structure 1 will be described together with their operation. The clip 10 is made of flexible resin material. The resin material is polyhexamethylene adipamide, for example. Another resin material may also be used as long as it is flexible and has the necessary strength.

As shown in FIGS. 1 to 4, the clip 10 is used to attach a pillar garnish 80 to a pillar 90. The clip 10 has a clip central axis 10a. The clip 10 has a base 20 that is orthogonal to the clip central axis 10a, and a tether portion 70 and a garnish retaining portion (engagement retaining portion) 72 that both rise at the same side from a surface of the base 20. The tether portion 70 and the garnish retaining portion 72 are integrally formed on the base 20.

The tether portion 70 allows the pillar garnish 80 to separate from the pillar 90 by a predetermined distance when the CSA 88 deploys, and forms a gap required for the CSA 88 to deploy into the vehicle cabin, between the pillar garnish 80 and the pillar 90. Meanwhile, the tether portion 70 inhibits the pillar garnish 80 from coming away from the pillar 90 more than a predetermined amount when the CSA 88 deploys, thereby inhibiting the pillar garnish 80 from flying out into the vehicle cabin. During normal operation, the garnish retaining portion 72 retains the pillar garnish 80 by engaging with the pillar garnish 80. On the other hand, when the CSA 88 deploys, the garnish retaining portion 72 allows the pillar garnish 80 to detach from the garnish retaining portion 72 and move away from the pillar 90.

The clip 10 may also include a shaft portion (which may also be referred to as a "leg portion" or a "body mounting portion") 22, a retaining protrusion 30, and one or more rattle inhibiting elastic piece (hereinafter, also simply referred to as an "elastic piece") 50. The shaft portion 22 is connected to the surface of the base 20 that is on the opposite side from the surface on which the tether portion 70 is provided, and extends away from the base 20 in a direction orthogonal to the base 20. The retaining protrusion 30 extends from a connecting portion 32 that is in a position away from the base 20 in the clip axial direction and is connected to the shaft portion 22, toward the base 20 side and ends at a free end. The shaft portion 22, the retaining protrusion 30, and the elastic piece 50 are on the same side of the base 20 in the clip axial direction.

Hereinafter, the shaft portion 22, the retaining protrusion 30, the elastic piece 50, and the tether portion 70 and the garnish retaining portion 72 will be described in more detail in this order. The central axis of the shaft portion 22 is aligned with a central axis 10a of the clip 10. The shaft portion 22 is hollow. The outer shape of a cross-section of the shaft portion 22 in a direction orthogonal to the clip central axis 10a is generally rectangular or generally round. Generally rectangular includes a square or rectangular shape with rounded corners. The illustrated example shows the outer shape of the cross-section of the shaft portion 22 being generally rectangular.

Two openings are respectively provided on portions of the shaft portion 22 that are opposite to each other across the central axis 10a. The retaining protrusions 30 are provided one in each of the openings. The retaining protrusions 30 face each other in a direction orthogonal to the clip axial direction, and are symmetrical about the clip central axis 10a.

Each retaining protrusion 30 is separated by a slit 26 (a gap between the retaining protrusion 30 and the open edge of the shaft portion 22 and the base 20) from the base 20 and the shaft portion 22, except for at the connecting portion 32 that is connected to the shaft portion 22. That is, there is an inverted U-shaped slit 26 between the retaining protrusion 30, and the base 20 and the shaft portion 22, except for at the connecting portion 32 that is connected to the shaft portion 22. An axial position of an end portion of the slit 26 at the side away from the base 20 matches, or substantially matches, an axial position of the connecting portion 32. The retaining protrusion 30 is able to elastically deform in a direction toward and away from the clip central axis 10a, i.e., in a direction in which it bends and stands erect around the connecting portion 32, because the clip 10 is made of flexible resin material.

Each retaining protrusion 30 has a protruding portion 34 and an engagement release lever 40. The protruding portion 34 and the engagement release lever 40 are separated from each other in the clip axial direction. The protruding portion 34 protrudes out farther in a direction away from the clip central axis 10a than the outer surface of the shaft portion 22, when the retaining protrusion 30 is in a free state, i.e., when a load is not being applied to the retaining protrusion 30. That is, a portion of the retaining protrusion 30 that protrudes out farther in a direction away from the clip central axis 10a than the outer surface of the shaft portion 22 is the protruding portion 34. The protruding portion 34 has a sliding surface 36 that is slanted away from the clip central axis 10a, from the connecting portion. 32 toward a base 20 side tip end portion of the retaining protrusion 30, on at least a portion of the protruding portion 34 in the clip axial direction. This sliding surface 36 becomes a sliding surface that slides on a body retaining hole 92 (also referred to as a clip mounting hole) inside surface when the clip 10 is inserted into the body retaining hole 92. The point where the sliding surface 36 starts to slant may be at the connecting portion 32, or it may be at a position away from the connecting portion 32 in the clip axial direction.

The retaining protrusion 30 bends and deforms in a direction toward the clip central axis 10a when the sliding surface 36 is pushed on by the inside surface of the body retaining hole 92 as the clip 10 is inserted into the body retaining hole 92 of the pillar 90 (such as an inner panel of a pillar). Then, the retaining protrusion 30 elastically returns to its original position (i.e., the position when it is in a free state) when the retaining protrusion 30 has passed through the body retaining hole 92. After elastically returning to its original position, the body retaining surface 38 that is a base-facing surface of the protruding portion 34 of the retaining protrusion 30 engages in the clip axial direction with a body retaining hole 92 peripheral edge portion of the pillar 90, such that the clip 10 will not come out of the body retaining hole 92, or will not come out of the body retaining hole 92 easily.

The engagement release lever 40 is provided to each retaining protrusion 30. The engagement release lever 40 is provided at a retaining protrusion tip end portion near the base 20 in the clip axial direction, and extends away from the clip central axis 10a at substantially a right angle to the clip central axis 10a. A tip end of the engagement release lever 40 is positioned farther away from the clip central axis 10a than an outside end of the protruding portion 34 is. Also, the tip end of the engagement release lever 40 is positioned farther away from the clip central axis 10a than an outside end of the base 20 is in the same direction.

When removing the clip 10 from the body retaining hole 92 when servicing, the engagement release levers 40 of the retaining protrusions 30 are pushed toward each other until the distance between the outside surfaces of the protruding portions 34 is the same or less than the distance between opposite inside surfaces of the body retaining hole 92, and then the clip 10 is pulled in the clip axial direction so that the shaft portion 22 is pulled out of the body retaining hole 92.

The elastic piece 50 absorbs looseness between the clip 10 and the pillar 90 when the clip 10 is attached to the pillar 90, with elastic deformation of the elastic piece 50, and thus inhibits the clip 10 from rattling against the pillar 90. The elastic piece 50 may also be integrally formed with the clip 10, as it is in the illustrated example, or it may be formed on a separator that is separate from the clip 10.

The elastic piece 50 has a slanted portion 54. The slanted portion 54 extends at an angle with respect to the base 20, from an elastic piece portion 50a that corresponds to a base portion 20a in a clip axial direction, toward the clip central axis 10a side, and away from the base 20. The base portion 20a is a portion of the base 20, and is separated from the clip central axis 10a.

The elastic piece portion 50a may be a portion of the clip 10 itself, or a portion of a separator that is separate from the clip 10. Also, the elastic piece portion 50a may be an elastic piece portion that is aligned with the base portion 20a in the clip axial direction, or it may be an elastic piece portion that is separated from the base portion 20a in the clip axial direction by the length of an axial portion 52 that will be described later.

Figure 2:
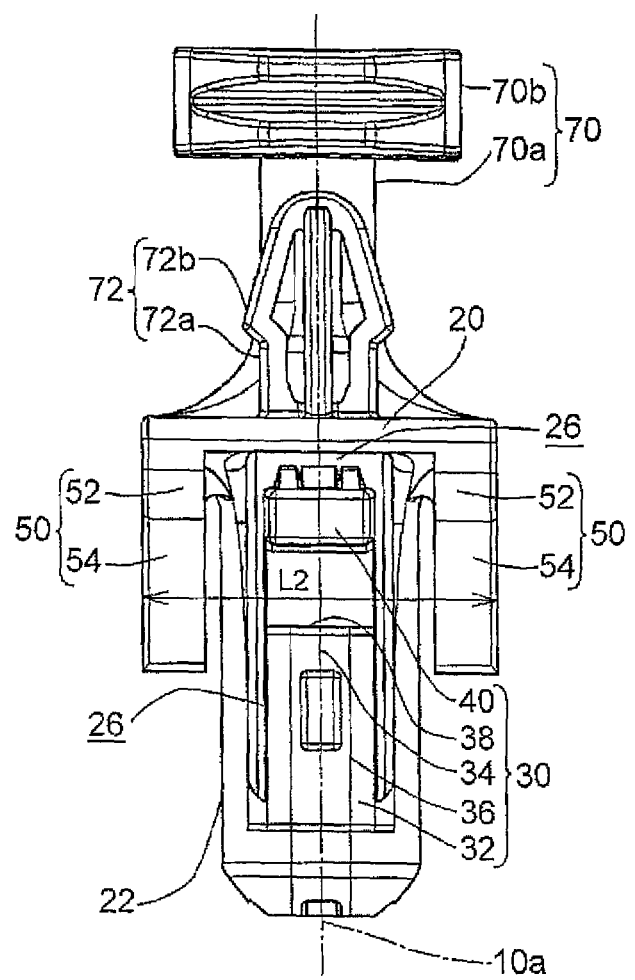
FIG. 2 is a side view of the tether clip in FIG. 1.
Figure 3:
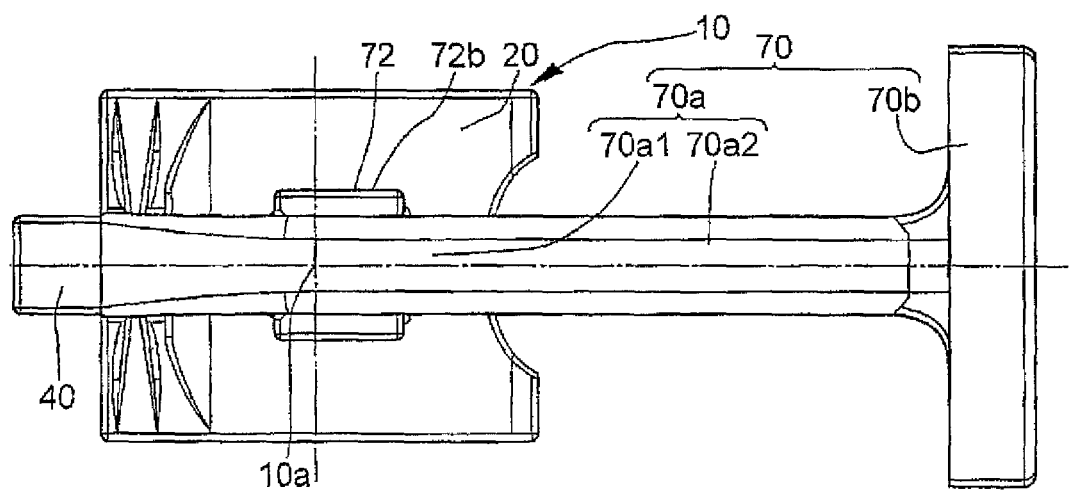
FIG. 3 is a plan view of the tether clip in FIG. 1.

The elastic piece 50 is provided at opposite sides across the clip central axis 10a, as shown in FIG. 1, in a direction parallel to a plane that includes the slanted portion 54. Also, the elastic piece 50 is provided at opposite sides across the clip central axis 10a, as shown in FIG. 2, in a direction orthogonal to a plane that includes the slanted portion 54. Thus, four of the elastic pieces 50 are provided, as shown in FIG. 4.

The slanted portion 54 extends at an angle toward the clip central axis 10a side and away from the base 20, as shown in FIG. 1, in a direction parallel to a plane that includes the slanted portion 54. Therefore, the distance between the slanted portions 54 of the elastic piece 50 at opposite sides across the clip central axis 10a becomes narrower farther away from the base 20. The distance between tip ends of the slanted portion 54 of the two elastic piece portions 50b on the side away from the base 20 will be denoted L1. When the external dimension of the base 20 is L0, not shown, in a plane that includes the pair of slanted portions 54, the distance L1 is equal to or less than L0. With a related clip having a slanted portion that is slanted so as to become farther away from the clip central axis as the distance from the base increases, the dimension between the tip end portions of the slanted portions (i.e., the dimension corresponding to L1 of the invention) is larger than the external dimension L0 of the base. Also, the distance L1 corresponds to one side of the area required for the rectangular clip mounting seat of the pillar 90. Therefore, the area required for the clip mounting seat of the pillar 90 is smaller than the area required for the clip mounting seat in a related clip having a slanted portion that is slanted so as to become farther away from the clip central axis as the distance from the base increases.

The slanted portion 54 extends at an angle toward the clip central axis 10a side. Therefore, even if a larger elastic piece deformation allowance than that of the related clip is ensured in the clip insertion direction by making a clip axial component of the length of the elastic piece 50 longer than that of the related clip and reducing the rigidity of the elastic piece 50, the flat surface required for the clip mounting seat will not be wider than that of the related clip. Also, by making the elastic piece deformation allowance greater than that of the related clip, a region where the change in the elastic piece reaction force with respect to the clip insertion amount is small (also referred to as a "flat region") is able to be formed along a wide elastic piece deformation area, in the characteristic of the deformation amount of the elastic piece with respect to the elastic piece reaction force. Also, by making the elastic piece deformation allowance larger than it is with the related clip, the elastic piece 50 according to the example embodiment of the invention abuts against the pillar 90 before the elastic piece of the related clip does. A proper engagement position of the clip 10 with respect to the pillar 90 is set in this flat region. As a result, the clip 10 is able to be pushed in with low reaction force across a long stroke before the proper engagement position. Thus, the insertability of the clip 10 into the body retaining hole 92 improves.

The rattling suppressing operation of the clip 10 with respect to the pillar 90 is reduced compared to the related clip in a direction parallel to the plane that includes the slanted portion 54 by reducing the distance L1, which is accomplished by having the slanted portion 54 extend at an angle toward the clip central axis 10a side. However, rattling is inhibited by the pillar garnish 80 abutting against another member, e.g., the pillar 90, at a portion other than the clip 10 portion, in the longitudinal direction of the pillar garnish 80, so rattling in the longitudinal direction of the pillar garnish 80 is not a problem. Where rattling of the pillar garnish 80 is a problem is in the width direction of the pillar garnish 80, i.e., a direction orthogonal to the plane that includes the slanted portion 54.

The slanted portion 54 is orthogonal to the base 20, as shown in FIG. 2, in a direction orthogonal to the plane that includes the slanted portion 54. The distance between the slanted portions 54 at opposite sides across the clip central axis 10a is constant in a direction orthogonal to the plane that includes the slanted portion 54. When the distance between outer surfaces of the slanted portions 54 in a direction orthogonal to the plane that includes the slanted portion 54 is denoted L2, L2 is set larger than L1, and thus is set to be the same, or substantially the same, as the distance between outside surfaces of the slanted portions of the related clip. As a result, the rattling suppression operation of the pillar garnish 80 with respect to the pillar 90 by the clip 10 is maintained to the same extent as with the related clip.

The elastic pieces 50 are provided symmetrically about the clip central axis 10a, as shown in FIG. 1, in a direction parallel to the plane that includes the slanted portion 54. The elastic piece 50 provided on each side of the clip central axis 10a is divided into two in a direction orthogonal to the plane that includes the slanted portion 54, as shown in FIG. 2. A space is provided between the two divided elastic pieces 50, and the engagement release lever 40 is arranged there. The engagement release lever 40 extends in a direction parallel to the plane that includes the slanted portion 54.

Because the space is provided between the two divided elastic pieces 50 in the direction orthogonal to the plane that includes the slanted portion 54, when the distance L2 between the outside surfaces of the two elastic pieces 50 is the same as it is with the related clip, the width of each elastic piece 50 is narrower than the width of the elastic piece of the related clip that is not divided. As a result, the bending rigidity of the elastic piece 50 is smaller than it is with the related clip, so the reaction force when the elastic piece 50 elastically deforms in the clip axial direction is smaller. Therefore, the combined reaction force-to-displacement amount (deformation amount) characteristic of the four elastic pieces 50 is easily flat across the wide displacement region both at and before the proper engagement position of the clip 10 with respect to the pillar 90.

The elastic piece 50 may also have an axial portion 52 that extends in the clip axial direction from the base side end portion of the slanted portion 54 toward the base 20 side. In the illustrated example, the elastic piece 50 is shown having the axial portion 52. When the elastic piece 50 has the axial portion 52, the axial portion 52 extends between the base 20 and the slanted portion 54. When the elastic piece 50 does not have the axial portion 52, the slanted portion 54 may be directly connected to the base 20.

An extended portion 56 or a protruding portion 60 is formed on at least one of the slanted portion 54 of the elastic piece 50 and the base 20, and extends toward the other of the slanted portion 54 and the base 20. As a result, a localized mountain (i.e., a portion where the insertion load becomes large) that appears when the extended portion 56 or the protruding portion 60 formed on at least one of the slanted portion 54 and the base 20 abuts against the other of the slanted portion 54 and the base 20 or the extended portion 56 or the protruding portion 60 formed on the other of the slanted portion 54 and the base 20, when the clip is inserted into the body retaining hole, is able to be formed in the flat region formed in the characteristic of the deformation amount of the elastic piece with respect to the reaction force of the elastic piece. Using this mountain, non-engagement or partial engagement of the clip 10 with respect to the pillar 90 is able to be suppressed more than it is when the mountain is not formed.

In the illustrated example, the axial portion 52 extends in the clip axial direction from the base portion 20a positioned at the end portion of the base 20. The slanted portion 54 extends at an angle with respect to the base 20, from the elastic piece portion 50a positioned at an end portion of the axial portion 52 at the side away from the base 20, in a direction toward the clip central axis 10a, and away from the base 20 and in the clip axial direction. The extended portion 56 extends at an angle with respect to the base 20, from the end portion of the slanted portion 54 that is at the side away from the base 20, in a direction toward the base 20 and in the clip axial direction, and toward the clip central axis 10a.

In the plane that includes the slanted portion 54, the protruding portion 60 has a generally triangular shape that tapers away from the base 20. When the clip 10 is installed to the pillar 90, the elastic piece portion (the end portion of the slanted portion 54) 50b abuts against the pillar 90 and is pushed such that the elastic piece 50 and the extended portion 56 elastically deform toward the base 20 side. A tip end portion 60a of the protruding portion 60 is provided in a position where a tip end portion 56a of the extended portion 55 that is at the base 20 side touches the tip end portion 60a. As a result, a mountain that appears when the tip end portion 56a of the extended portion 56 touches the tip end portion 60a of the protruding portion 60, is formed in the flat region in the characteristic of elastic piece displacement-to-elastic piece reaction force. The mountain rises when the tip end portion 56a of the extended portion 56 touches the tip end portion 60a of the protruding portion 60, and falls when the tip end portion 56a of the extended portion 56 comes away from the tip end portion 60a of the protruding portion 60 and slides on the surface of the protruding portion 60.

The tether portion 70 is provided in a location away from the garnish retaining portion 72, and is integrally joined to the base 20 at a portion away from the base 20. A seat portion from which the garnish retaining portion 72 rises overlaps with the clip central axis 10a, and the base portion from which the tether portion 70 rises is offset from the central axis 10a. The base portion from which the garnish retaining portion 72 rises is a center portion of the base 20, and the base portion from which the tether portion 70 rises is an end portion of the base 20. The tether portion 70 is arranged from one side of the garnish retaining portion 72 of the base 20 to the other side of the garnish retaining portion 72 of the base 20, directly above the garnish retaining portion 72.

The tether portion 70 includes an anchor portion 70b provided on a tip end at the side away from the base 20, and a connecting portion 70a that connects the base 20 to the anchor portion 70b. At least a portion of the connecting portion 70a in the longitudinal direction may be curved. In the illustrated example, the connecting portion 70a has a curved portion 70a1 that curves in an arc and is connected to the base 20 at one end, and a straight portion 70a2 that extends in a straight line parallel or substantially parallel to the base 20 from the other end of the curved portion 70a1 to the anchor portion 70b. The curved portion 70a1 of the connecting portion 70a is preferably in a plane that extends in the longitudinal direction of the pillar garnish 80. The direction in which the straight portion 70a2 of the connecting portion 70a extends is preferably in a plane that extends in the longitudinal direction of the pillar garnish 80. By orienting the direction of curvature of the connecting portion 70a in the longitudinal direction of the pillar garnish 80, and positioning the anchor portion 70b to the outside of the tether clip housing portion 81 that will be described alter, the connecting portion 70a is able to be made longer, so the deployment gap between the pillar garnish 80 and the pillar 90 when the CSA 88 deploys is able to be larger. The anchor portion 70b extends in a direction orthogonal to the straight portion 70a2 of the connecting portion 70a and is parallel to the base 20.

When attaching the clip 10 to the pillar garnish 80, the anchor portion 70b is inserted through the tether portion insertion hole 84. The tether portion insertion hole 84 is formed, in the bottom wall 82 of the tether clip housing portion 81 of the pillar garnish 80 and extends in the pillar garnish longitudinal direction. Then, the anchor portion 70b is inserted through the space between the two adjacent engaging walls 86 and extends out between these engaging walls 86, and is rotated 90 degrees so as to be retained to the end surfaces of the engaging walls 86 when the CSA deploys. With the tether clip 10 attached to the pillar garnish 80, the shaft portion 22 of the tether, clip 10 is pushed into the body retaining hole 92 of the pillar 90, such the pillar garnish 80 with the tether clip 10 is attached to the pillar 90.

When the CSA deploys and the pillar garnish 80 is pushed away from the pillar 90 by the deploying CSA 88, the pillar garnish 80 moves until the anchor portion 70b of the tether portion 70 abuts against a pillar garnish longitudinal direction end surface 87 of the engaging walls 86, creating a deployment gap for the CSA 88 between the pillar garnish 80 and the pillar 90. The CSA 88 passes through this deployment gap between the pillar garnish 80 and the pillar 90 and is deployed into the vehicle cabin between the occupant and the side door, thereby restraining and protecting the head of the occupant.

When the anchor portion 70b abuts against the pillar garnish longitudinal direction end surface 87 of the engaging walls 86 when the CSA deploys, the pillar garnish 80 is unable to move any further and therefore is prevented from flying into the vehicle cabin.

The garnish retaining portion 72 rises from the base 20 in a direction opposite the shaft portion 22. The garnish retaining portion 72 has a rising portion 72a that rises from the base 20 by an amount substantially equal to the thickness of the peripheral edge portion of the tether portion insertion hole 84 of the bottom wall 82, and a bulging portion 72b that extends in a direction even farther away from the base 20 from a tip end of the rising portion 72a and bulges out in a direction orthogonal to the rising direction of the rising portion 72a. The bulging portion 72b is formed in a hollow shape so as to have elasticity in the direction orthogonal to the rising direction.

When attaching the tether clip 10 to the pillar garnish 80, the garnish retaining portion 72 is pushed into the tether portion insertion hole 84 of the bottom wall 82. At this time, the bulging portion 72b elastically deforms in a direction that reduces the bulge amount, and passes through the tether portion insertion hole 84. When the bulging portion 72b passes through the tether portion insertion hole 84, the bulging portion 72b elastically returns to its original position (the position when the bulging portion 72b is in a free state), such that the bottom wall 82 is retained between the bulging portion 72b and the base 20. The tether clip 10 is attached to the pillar 90 while this state is maintained.

When the CSA deploys and the pillar garnish 80 is pushed away from the pillar 90 by the deploying CSA 88, the peripheral edge portion of the tether portion insertion hole 84 pushes the bulging portion 72b of the garnish retaining portion 72 in a direction in which the bulging portion 72b will come out, thereby elastically deforming the bulging portion 72b in a direction in which the bulge amount is reduced. The bulging portion 72b then passes through the tether portion insertion hole 84, and the bottom wall 82 comes away from the bulging portion 72b of the garnish retaining portion 72. As a result, the pillar garnish 80 moves until the anchor portion 70b of the tether portion 70 abuts against the pillar garnish longitudinal direction end surface 87 of the engaging walls 86.

The pillar garnish mounting structure 1 includes the clip 10, the pillar 90, and the pillar garnish 80 that is attached to the pillar 90 using the clip 10, as shown in FIGS. 5 and 6.

The clip 10 is the same as the clip described above. The pillar 90 includes a front pillar and the front pillar includes an inner panel. The pillar 90 has a longitudinal direction, and the pillar garnish 80 extends in the longitudinal direction of the pillar 90. The pillar garnish 80 is attached to the inner panel of the pillar 90 by the tether clip 10. The pillar garnish 80 is made of plastic that is as rigid or more rigid than the clip 10.

The pillar garnish 80 has the tether clip housing portion 81 that is locally formed in the longitudinal direction of the pillar garnish 80. The tether clip housing portion 81 has the main body wall 83 of the pillar garnish 80, the bottom wall 82 that is separated from the main body wall 83, and at least two engaging walls (also referred to as "side walls") 86 that connect the main body wall 83 to the bottom wall 82 and retain the anchor portion 70b when the CSA deploys. The rectangular tether portion insertion hole 84 is provided in the bottom wall 82. The CSA 88 is housed folded up in a back space of the pillar garnish 80. When a vehicle collision occurs, the CSA 88 deploys and inflates, pushing the pillar garnish 80 toward the vehicle cabin side, such that a deployment gap forms between the pillar garnish 80 and the pillar 90. The CSA 88 passes through this gap and deploys between an occupant and a side door, thereby protecting the head of the occupant. Reference character 88' in FIG. 6 denotes a portion of the CSA during deployment, and reference character 80' in FIG. 6 denotes a portion of the pillar garnish that has been pushed away.

Next, the effects of the clip 10 and the pillar garnish mounting structure 1 that uses the clip 10 according to the first example embodiment will be described.

With the clip 10, the tether portion 70 is provided in a location away from the garnish retaining portion 72, so the space in the tether clip housing portion 81 of the pillar garnish 80 in the vehicle inside direction (a direction orthogonal to the pillar garnish longitudinal direction), i.e., the distance between the bottom wall 82 and the main body wall 83, is able to be reduced by an amount corresponding to the height of the garnish retaining portion 72, compared to the clip according to the related art in which the tether portion extends from the top portion of the garnish retaining portion. Also, the bending curvature radius of the curved portion 70a1 of the connecting portion 70a is able to be increased, so the tether portion 70 is able to be prevented from fracturing when the tether portion 70 is stretched when the CSA deploys.

Also, the tether portion 70 is arranged from one side of the base 20 to the other side, directly above the garnish retaining portion 72, so the pillar garnish longitudinal direction space in the tether clip housing portion 81 of the pillar garnish 80 is able to be made smaller by the distance between the tether portion 70 and the garnish retaining portion 72, compared to the clip according to the related art in which the tether portion extends from the top portion of the garnish retaining portion.

Also, the base portion from which the garnish retaining portion 72 rises overlaps with the clip central axis 10a, and the base portion from which the tether portion 70 rises is offset from the clip central axis 10a, so the garnish retaining portion 72 is the base center portion, and the tether portion 70 is the base end portion. Therefore, the pillar garnish longitudinal direction space of the tether clip housing portion 81 is able to be made smaller by the distance between the tether portion 70 and the garnish retaining portion 72.

Also, with the pillar garnish mounting structure 1, the tether portion 70 is arranged from the vehicle front side to the vehicle rear side in the longitudinal direction of the pillar 90, so the space in vehicle inside direction inside the tether clip housing portion 81 of the pillar garnish 80, i.e., the distance between the bottom wall 82 and the main body wall 83, is able to be reduced by an amount corresponding to the height of the garnish retaining portion 72. Also, the bending curvature radius of the curved portion 70a1 of the connecting portion 70a is able to be increased. As a result, the pillar garnish 80 is able to be made smaller, and the reliability in terms of strength of the clip 10 is able to be improved.

What is claimed is:

1. A tether clip used to attach a pillar garnish to a pillar, comprising:
    a base;
    a tether portion that rises from a surface of the base; and
    a garnish retaining portion that rises from the surface of the base, wherein
    the tether portion is provided in a location away from the garnish retaining portion.
2. The tether clip according to claim 1, wherein
    the tether portion is arranged from a first side of the base to a second side of the base, directly above the garnish retaining portion.
3. The tether clip according to claim 2, wherein
    the first side of the base constitutes a first end portion of the base; and
    the second side of the base constitutes a second end portion of the base that is opposite to the first end portion of the base.
4. The tether clip according to claim 1, wherein
    a first portion of the base from which the garnish retaining portion rises overlaps with a clip central axis; and
    a second portion of the base from which the tether portion rises is offset from the clip central axis.
5. The tether clip according to claim 4, wherein
    the second portion of the base constitutes an end portion of the base.
6. The tether clip according to claim 1, wherein
    the tether portion has a curved portion that connects to the base and extends to directly above the garnish retaining portion.
7. The tether clip according to claim 6, wherein
    a connecting portion of the curved portion that connects to the base is separated from the garnish retaining portion in a longitudinal direction of the tether portion.
8. The tether clip according to claim 7, wherein
    the tether portion has a straight portion that connects to the curved portion and is parallel to the surface of the base.
9. The tether clip according to claim 1, wherein
    the garnish retaining portion has a bulging portion that bulges out in a direction orthogonal to a longitudinal direction of the tether portion and a rising direction of the garnish retaining portion.
10. The tether clip according to claim 1, wherein
    the tether portion, the garnish retaining portion, and the base are integrally formed.
11. A pillar garnish mounting structure comprising:
    the tether clip according to claim 1;
    a pillar; and
    a pillar garnish that is attached to the pillar by the tether clip, wherein
    the tether portion is arranged from a vehicle front side to a vehicle rear side in a longitudinal direction of the pillar.
12. The pillar garnish mounting structure according to claim 11, wherein
    the pillar has a body retaining hole; and
    the tether clip has a retaining protrusion that is inserted through the body retaining hole and engages with the body retaining hole.
13. The pillar garnish mounting structure according to claim 11, wherein
    the garnish retaining portion is attached to the pillar garnish.

* * * * *